Nov. 24, 1964  D. HUGHSON  3,158,036
FRICTION DRIVE MECHANISM
Filed April 11, 1963  5 Sheets-Sheet 1

INVENTOR:
DOUGLAS HUGHSON
BY John G. Faulkner
and Donald J. Harrington
ATTORNEYS.

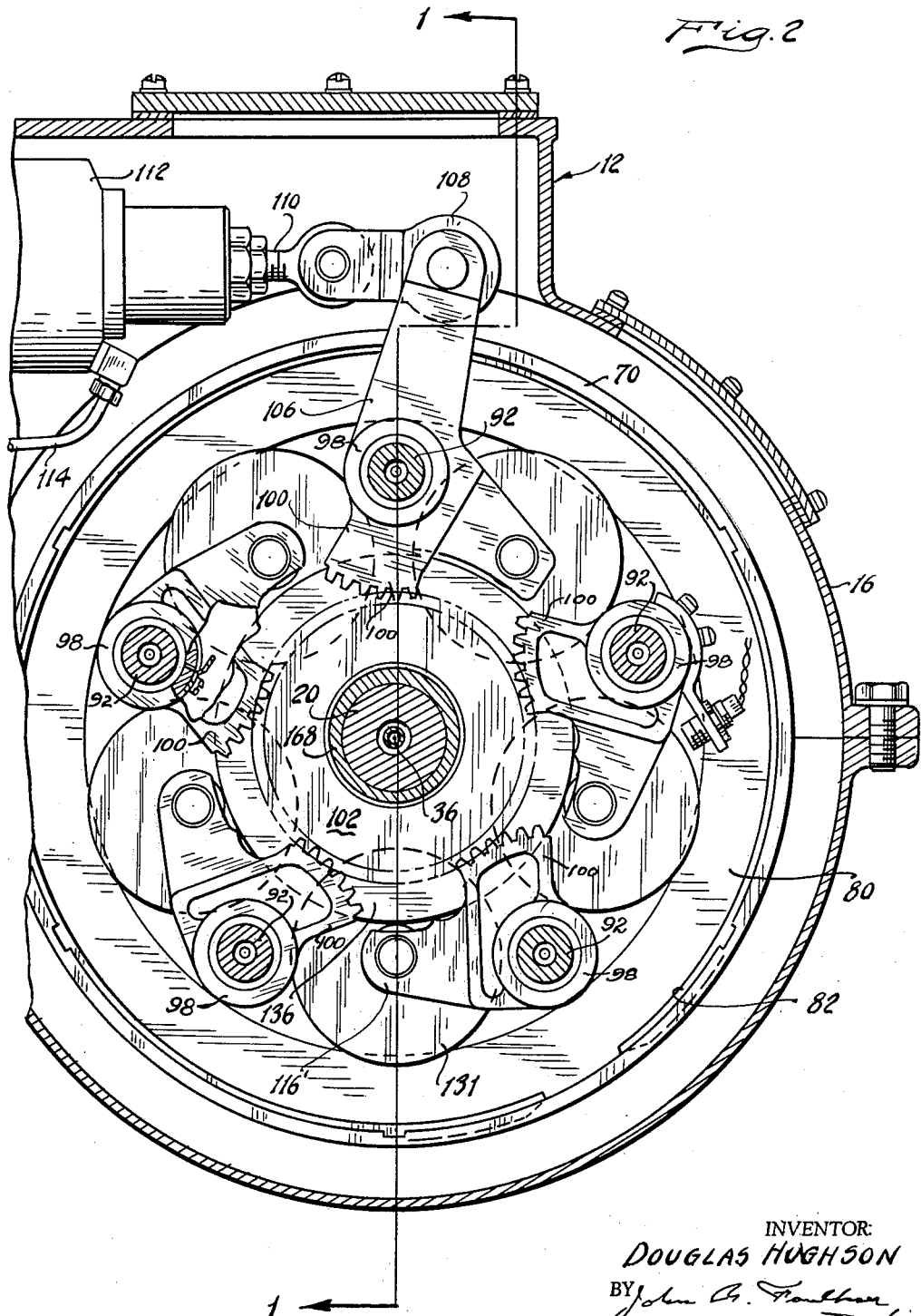

Nov. 24, 1964 D. HUGHSON 3,158,036
FRICTION DRIVE MECHANISM
Filed April 11, 1963 5 Sheets-Sheet 3
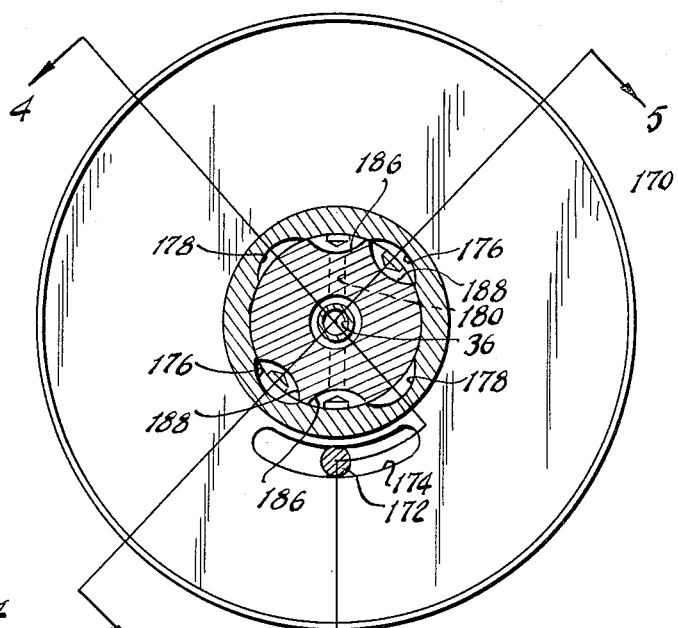
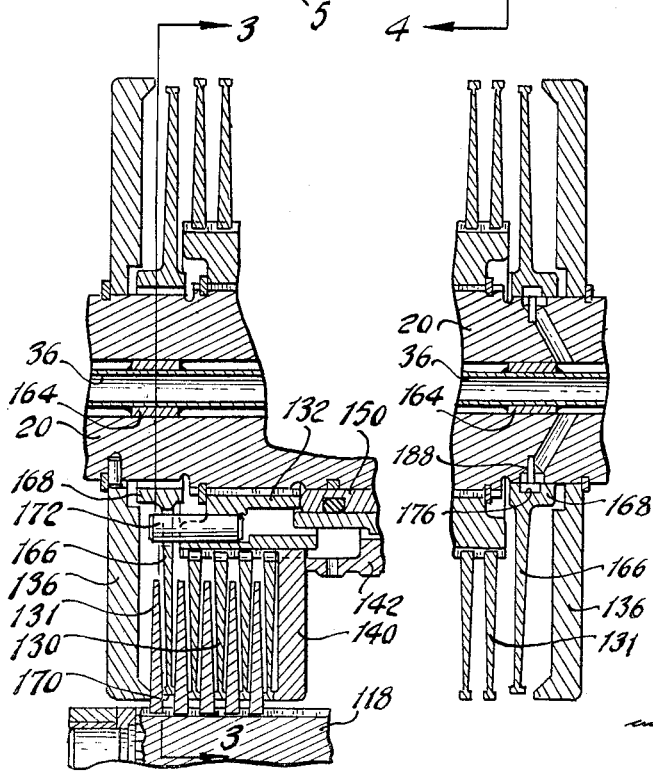
INVENTOR:
DOUGLAS HUGHSON
ATTORNEYS.

Nov. 24, 1964  D. HUGHSON  3,158,036
FRICTION DRIVE MECHANISM
Filed April 11, 1963  5 Sheets-Sheet 4

INVENTOR:
DOUGLAS HUGHSON
BY John A. Faulkner
and Donald J. Harrington
ATTORNEYS.

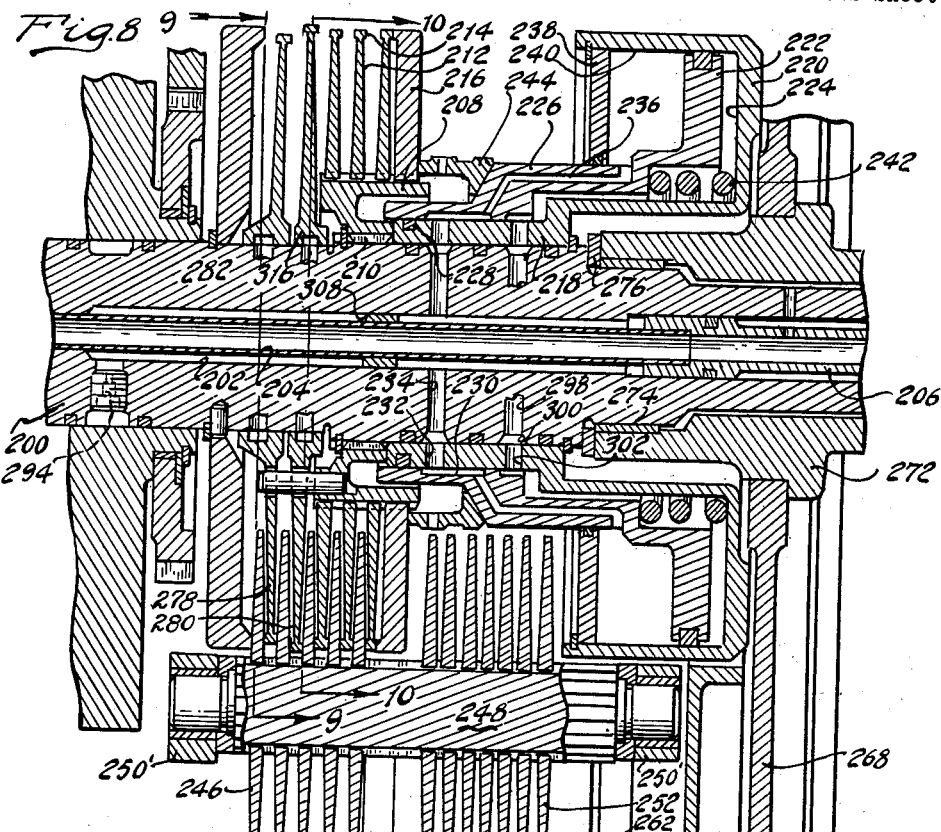

United States Patent Office 3,158,036
Patented Nov. 24, 1964

3,158,036
FRICTION DRIVE MECHANISM
Douglas Hughson, Royal Oak, Mich., assignor to Ford Motor Company, Dearborn, Mich., a corporation of Delaware
Filed Apr. 11, 1963, Ser. No. 272,367
13 Claims. (Cl. 74—199)

My invention relates generally to friction drives, and more particularly to improvements in controls for a friction disc drive mechanism. Although it is capable of being used in a variety of environments, my invention is adapted especially to be used in a friction disc mechanism for a wheeled vehicle for transferring driving power from the vehicle engine to the traction wheels.

The improvements of my invention can be adapted readily for use in a friction disc drive having driving and driven discs disposed in interdigital frictional driving relationship. The driven discs are adapted to rotate upon an axis that is offset with respect to the axis of the driving discs. As the axes of the discs are moved relative to each other, the driving speed ratio between the discs changes accordingly.

It is necessary in an arrangement of this type to maintain a desired clamping pressure between the cooperating discs so that the driving relationship may be maintained regardless of varying torque delivery requirements. A relatively slight clamping pressure is required during low torque delivery conditions and a higher clamping pressure is required to maintain capacity under high torque delivery conditions. It is undesirable to design the mechanism to accommodate at all times the most extreme torque delivery requirements since the clamping pressure that would be experienced under low torque delivery conditions would be too severe and would result in an inefficient drive as well as an excessive rate of wear of the friction surfaces.

In a unit of this type, a predetermined degree of slip between driving discs and the driven discs is experienced when the clamping pressure for any given driving torque condition is at an optimum value. The degree of slip is relatively slight, but it is a of a controlled amount. This controlled slip is not accompanied by an accelerated rate of wear or by a reduction in efficiency since it is possible under these circumstances to maintain a lubricating film of oil between the cooperating surfaces of the discs.

I maintain clamping pressure between the driving and driven discs in my improved mechanism by means of a fluid pressure operated servo. The degree of clamping pressure thus can be made dependent upon the magnitude of the pressure that is made available to the servo. It is a principal object of my invention to provide an improved means for maintaining a desired control pressure in the servo and for varying the pressure in accordance with the changing torque delivery requirements.

It is a further object of my invention to provide a friction drive having a fluid pressure operated servo for maintaining clamping pressure between the driving and driven discs wherein the servo pressure is made dependent upon the degree of slip between the driving and driven discs.

It is a further object of my invention to provide a friction disc drive having cooperating frictionally engageable driving and driven disc assemblies wherein clamping pressure is maintained on the discs by means of a fluid pressure operated servo and wherein the pressure is made available to the servo is controlled in turn by means of an idler disc which functions as a servo pressure control valve. I contemplate that the idler disc will be driven with zero slip between the cooperating surface of its companion disc and its own friction surface. I contemplate also the effective operating diameter of the idler disc will be different than the effective diameter of the adjacent driving discs. The operating speed of the idler disc, although it operates at zero slip, will be the same as the operating speed of the driving discs with which it is associated by reason of the fact that it is provided with a differential diameter.

It is an object of my invention to provide an arrangement of the type above set forth wherein the differential disc diameters and the degree of slip that is desired under any driving torque delivery condition will be matched so that the valving action established by the idler disc will maintain the desired control pressure in the friction disc servo. Any deviation of the slip from a desired design value therefore will be accompanied by a rotary shifting movement of the idler disc relative to the associated driving discs.

It is a further object of my invention to utilize the shifting movement described in the foregoing paragraph to initiate a valving response which in turn makes an appropriate adjustment in the operating pressure level of the disc clamping servo to restore the slip to the original design value following a change in the operating torque.

It is a further object of my invention to provide a friction disc drive arrangement of the type above set forth wherein provision is made for employing paired idler discs to maintain a desired servo capacity during both driving torque delivery and reverse or coasting torque delivery.

It is a further object of my invention to provide a drive of the type above set forth wherein the valving action established by either disc will maintain a desired control pressure in the servo with a minimum degree of dissipation of pressurized fluid into the low pressure exhaust region.

For the purpose of describing more particularly the improvemens of my invention, reference will be made to the accompanying drawings, wherein:

FIGURE 2 is a cross-sectional view of the structure of FIGURE 1 taken along section line 2—2 of FIGURE 1;

FIGURE 3 is a cross-sectional view taken along section line 3—3 of FIGURE 1 showing the valving arrangement of an idler disc;

FIGURE 4 is a cross-sectional view taken along section line 4—4 of FIGURE 3;

FIGURE 5 is a cross-sectional view taken along section line 5—5 of FIGURE 3;

FIGURE 8 is a cross-sectional view of another modified form of my invention;

FIGURE 9 is a cross-sectional view taken along section line 9—9 of FIGURE 8; and FIGURE 10 is a cross-sectional view taken along section line 10—10 of FIGURE 8.

Figure 1:
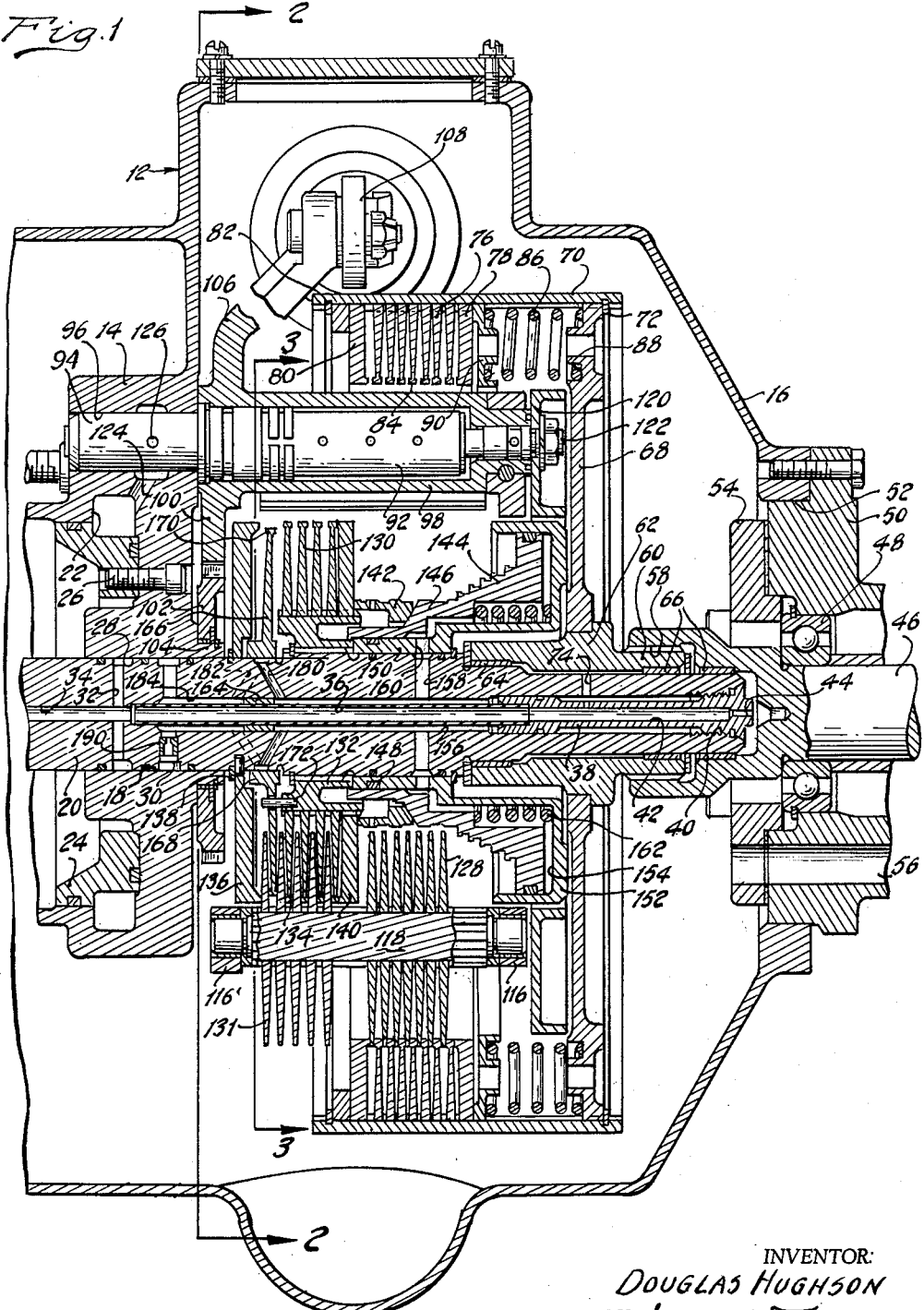
FIGURE 1 shows in cross-sectional form a friction disc drive arrangement employing the improvement of my invention.

Referring first to FIGURE 1, a transmission housing is designated generally by reference character 12. It includes a forward wall portion 14 and a rearward wall portion 16. Formed in wall portion 14 is an opening 18 within which is journalled a power input shaft 20. The wall 14 defines also a fluid pressure distributor manifold which includes a pressure distributing annular recess 22 which is defined in part by an insert 24 bolted by bolts 26 against the wall 14 as indicated. Suitable internal passages, not shown, communicate with annular grooves 28 and 30 formed in shaft 20.

A lubricating oil circuit is defined in part by the groove 28 and by a cooperating radial passage 32 which communicates in turn with a central passage 34 formed in shaft 20.

Passage 34 communicates also with the interior of a tubular sleeve insert 36 located within a central bore in shaft 20. Insert 36 is received in register with a cooperating opening formed in a flow distributing insert 38 located in a large diameter portion of the bore in shaft 20. This insert 38 is received threadably in a threaded section of its cooperating large diameter base portion as shown at 40.

Insert 38 is formed with an internal passage 42 which is a continuation of the passage defined by insert 36. The end of passage 42 communicates with the exterior of the shaft 20 through a flow restricting orifice 44.

A driven shaft is shown at 46. It is journalled by means of a bearing 48 within a bearing support 50 which in turn is secured within an opening 52 formed in the end wall 16. A bearing retainer 54 is bolted by bolts 56 to the member 50.

Shaft 46 is formed with an internally splined recess 58 and a cooperating externally splined extension 60 is received therein as indicated to establish a driving connection between extension 60 and shaft 46.

Extension 60 forms a part of a disc drum hub 62 which in turn is journalled by means of bushings 64 and 66.

The hub 62 is secured to a drum member 68 which extends radially outwardly and which is connected by means of a spline connection to an internally splined drum member 70. This member 70 is held axially fast with respect to member 68 by snap-ring 72.

The lubricating oil passage shown at 36 and 42 communicates with bushings 66 through the orifice 44. Lubricating fluid is applied to bushing 64 as well as bushing 66 through a radial passage 74 which in turn communicates with the interior of insert 38.

Externally splined driven discs 76 are connected to the internally splined periphery of drum member 70. A clamping pressure disc 78 also is externally splined to member 70 adjacent the assembly of discs 76. A reaction disc 80 also is carried by member 70 and is held axially fast by snap-ring 82 and by a cooperating spacer as indicated.

The periphery 84 of each disc 76 is formed with an enlargement, and the inner peripheral margin of the enlarged portion forms a pair of conical friction surfaces.

Clamping pressure is applied to the pressure disc 78 by means of the clamping spring 86 which is seated on the outer peripheral portion 88 of the drum member 68. A clamping ring 90 is engaged directly by the spring 86 and urges the clamping pressure disc 78 into clamping engagement with the driven disc 76 situated directly adjacent to it.

Stationary support shafts 92, preferably five in number, are anchored in cantilever fashion to the wall 14. The means for establishing the connections with wall 14 include extensions 94 formed on shafts 92. Each extension is received within a cooperating opening 96 formed in wall 14. Journalled upon each shaft 92 is a sleeve 98 which in turn is connected integrally to a gear segment 100. This segment engages in turn an idler gear 102 that is journalled upon an extension 104 of the wall 14. Sleeve 98 is connected integrally also to a servo operated control arm 106 that extends in a generally radially outward direction. The extended end of arm 106 is connected by means of a pin connection 108 to a fluid pressure operated servo element 110.

By referring to FIGURE 2 it will be observed that the element 110 forms a part of a fluid pressure operated servo identified generally by reference character 112. Control pressure can be distributed to the servo 112 through a suitable control pressure distributor passage 114. By appropriately pressurizing the servo 112, the member 110 can be moved in a right-hand direction or a left-hand direction as viewed in FIGURE 2. This, of course, causes either clockwise adjustment or counter-clockwise adjustment of sleeve 98 about the axis of the shaft 92. Sleeve 98 is connected also to a carrier disc supporting arm 116 which in turn journals a carrier disc shaft 118 at one end thereof. A second arm 116', as indicated in FIGURE 1, is connected also with the sleeve 98 and rotates in unison with the arm 116. This arm 116' journals the other end of the shaft 118.

As indicated in FIGURE 2, there is provided a plurality of supporting shafts 92 and cooperating sleeves 98. Each sleeve 98 includes carrier disc supporting arms 116 and 116'. The shafts 92 are connected together for added support by means of an annular supporting ring 120, a suitable bolted connection 122 being provided for this purpose.

A lubricating oil passage 124 communicates with the recess 22 described previously. It communicates also with a central axially extending opening, not shown, in the shaft 52 through a radial passage 126. This passage communicates with the cooperating bearing surfaces of the sleeve 98 through radial passages as indicated.

The gear segment 100 of each sleeve 98 engages the gear 102. Thus when the arm 106 is adjusted by the pressure operated servo, each of the carrier disc supporting shafts 118 is moved in a radial direction, either inwardly or outwardly depending upon the direction of movement of the servo operated element 110.

Shafts 118 are externally splined to facilitate a driving connection with internally splined discs 128. These discs are situated in interdigital, frictional driving relationship with respect to the driven discs 76, and they are conical in form so that they register with the conical peripheries of the discs 76. Connected also to each shaft 118 is a second series of discs 131 which are spaced from the discs 128. These discs are situated in interdigital, frictional driving relationship with respect to so-called driving sun discs 130 which in turn are internally splined to an internally splined sun disc hub 132. This hub 132 is splined in turn to shaft 20. The outer peripheries 134 of sun discs 130 are formed with opposed conical surfaces that register with cooperating conical surfaces of the discs 131.

Keyed to shaft 20 is a reaction disc 136. This disc is held axially fast upon shaft 20 by means of a snap-ring 138.

Situated on the opposite side of the assembly of discs 130 is a pressure plate or disc 140 having an outer periphery which frictionally engages the periphery of the adjacent sun disc 130. This disc 140, like the sun discs 130, is splined to the hub 132.

A thrust transmitting member 142 is situated about the shaft 20 and is adapted to apply an axial force to disc 140. A piston member 144 in turn is adapted to apply an axial force to the member 142. This piston includes an extension 146 which engages directly the member 142. Extension 146 is sealed by means of a seal 148 to a cooperating extension 150. It is situated in telescopic relationship with respect thereto. Extension 150 forms a part of an annular cylinder 152 and is journalled upon shaft 20 as indicated. The cylinder 152 and the piston 144 cooperate to define a pressure cavity 154 which is in fluid communication with internal passage 156 through a radial passage 158 and through a cooperating port 160 formed in extension 150.

A clamping spring 162 is situated between cylinder 152 and the piston 144. This spring 162 applies normally a minimum design clamping pressure to the sun discs 130.

The passage 156 is defined by the central bore formed in shaft 20 and by the insert 36. This passage 156 is blocked at the right-hand end by the insert 38. It is blocked also at an intermediate portion thereof by an annular insert 164 disposed between the insert 36 and the surrounding wall of the bore in shaft 20.

An idler disc, hereinafter referred to as a control disc, is indicated by reference character 166. It includes a hub 168 and an outer peripheral portion 170, the latter being situated in frictional driving relationship with respect to each of two adjacent carrier discs 131. The diameter of the disc 166, however, is slightly smaller than the diameter of the sun discs 130.

As best seen in FIGURES 3, 4 and 5, the disc 166 is connected to the hub 132 by means of a lost motion pin connection. This connection comprises a pin 172 received within an annular slotted opening 174 formed in disc 166. The disc 166 thus is capable of being moved to a limited degree relative to hub 132.

The hub 168 of the disc 166 is journalled upon shaft 20. It is formed with pressure ports 176 and exhaust ports 178. The pressure ports communicate with radially extending passages 182 which extend from a supply passage 184 located on the left-hand side of the spacer 164. The passages 180 extend to the supply passage 156 on the right-hand side of the spacer 164.

Passages 180 communicate with valve recess portions 186 formed in shaft 20 and passages 182 communicate with valve recess portions 188 formed in shaft 20.

It is apparent, therefore, that if fluid is supplied through passage 184, pressure will be distributed through passages 182 and 180 to passage 156 if the disc 166 is rotated in a clockwise direction, as viewed in FIGURE 3, with respect to the shaft 20. At the same time, the degree of restriction between valve recess portions 186 and exhaust ports 178 will be increased. This, of course, will result in an increase in the pressure in passage 156 and in the working chamber 154 of the servo.

Conversely, if the disc 166 is rotated in a counterclockwise direction, as viewed in FIGURE 3, with respect to the shaft 20, the degree of communication between recess portions 186 and ports 178 will be increased, and the degree of communication between ports 176 and recess portions 186 will be decreased correspondingly. This will result in a reduction of the pressure in passage 156 and in the servo. Variations of the pressure in the servo working chamber 154, of course, will result in a change in the clamping force that is applied to the sun discs 130 and the cooperating carrier discs 131.

Pressure is applied to the passage 184 from the previously described annular groove 30 through a flow restricting orifice defined by insert 199.

During operation of the mechanism under torque, the control disc 166 will tend to overrun the sun discs 130 due to the fact that the diameter of the disc 166 is less than the diameter of the discs 130. But since the disc 166 does not deliver torque, and since the discs 130 are designed to accommodate a limited degree of slip with respect to the carrier discs 131, the actual driving speed of the control disc 166 can be made to be equal to the speed of the discs 130. Under these conditions, the valving action of the disc hub 186 will permit a desired control pressure to develop in the servo working chamber 154.

The disc valve can be calibrated so that a control pressure necessary to maintain the design slip will be maintained regardless of changes in the driving torque. For example, if the driving torque were to be increased, there would be an immediate tendency for the discs 130 to slip to a greater degree with respect to the carrier discs 131. This, of course, will tend to cause the control disc 166 to lag behind the discs 130. As soon as this occurs, however, the degree of communication between passage 184 and passage 156 through the valving will be increased and the corresponding communication between passage 180 and the exhaust recesses 178 will be decreased. This in turn will result in an increased pressure in the servo, thereby reducing the slip by reason of the fact that the clamping pressure will be increased. This action will continue until the original design slip has been restored, at which time the control disc 166 will assume a balanced operating position with respect to the sun discs 130.

Figure 6:
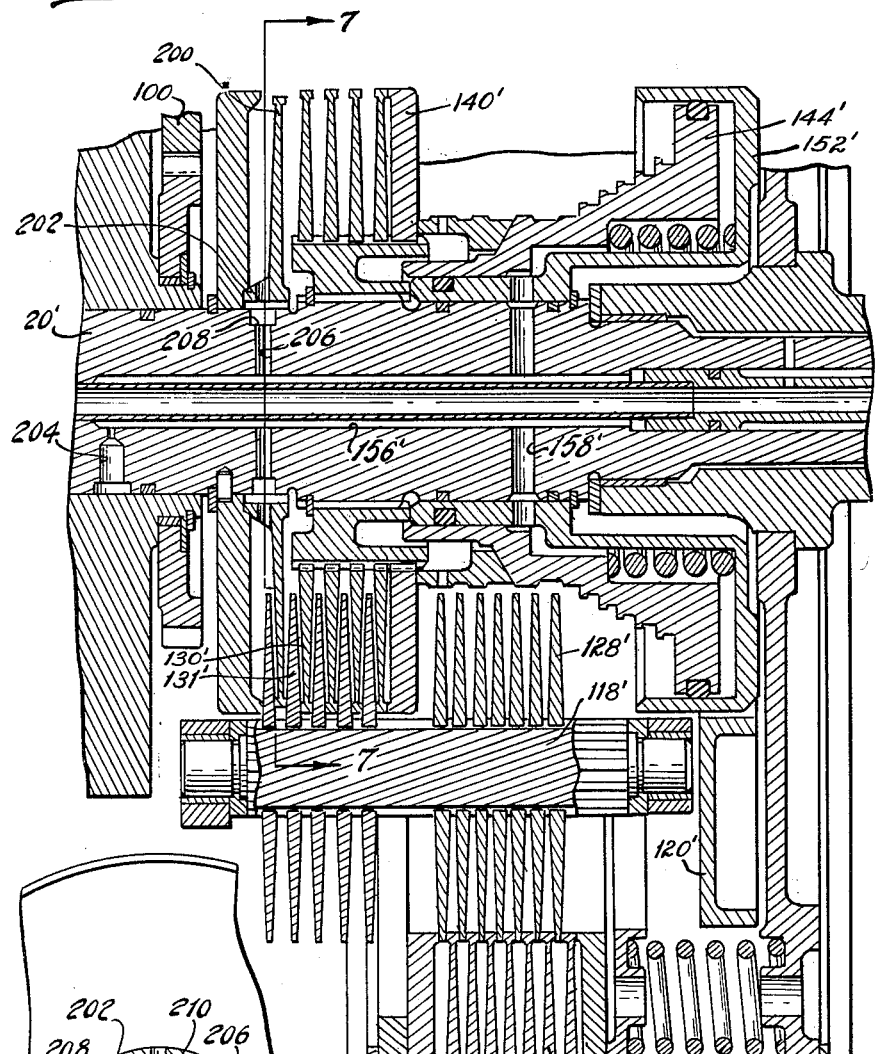
FIGURE 6 is a cross-sectional view of a modified form of my invention.
Figure 7:
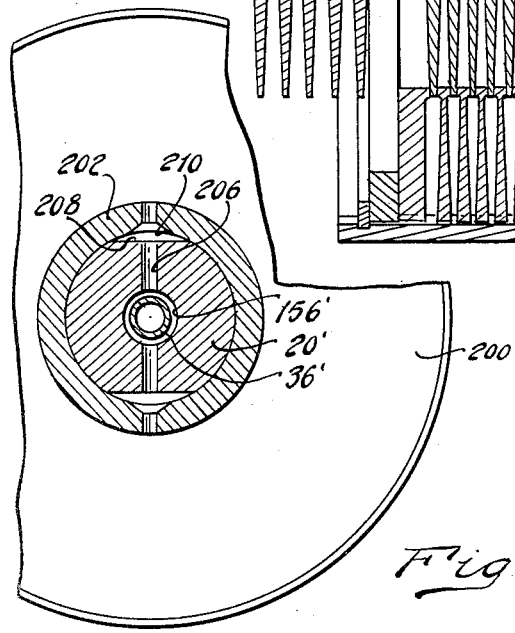
FIGURE 7 is a cross-sectional view taken along section line 7—7 of FIGURE 6.

Referring next to FIGURES 6 and 7, I have shown another embodiment which employs a modified valving arrangement of the control discs and the cooperating valve recesses in the power input shaft. For purposes of simplicity, the parts of the structure of FIGURE 6 that correspond to the elements in the embodiment of FIGURES 1 through 5 have been indicated by similar reference characters although primed notations have been added.

The structure of FIGURES 6 and 7 includes a control disc 200 which has a hub 202 journalled upon shaft 20'. Formed in shaft 20' is a pressure passage 156' which communicates with a fluid pressure operated servo through a radial passage 158'.

Control pressure is applied to passage 156' through a flow restricting port 204.

Shaft 20' is formed with radially extending passages 206 which communicate with transverse grooves 208. These grooves in turn register with valve recesses 210 formed in hub 202. The valve recesses in turn communicate at either axial end of the hub with the exhaust region. It thus is apparent that if the control disc 200 is rotated with respect to the shaft 20' in either one direction or the other, the degree of communication between passage 156' and the exhaust region will be restricted. This will result in a pressure build-up in the pressure chamber of the servo, thereby augmenting the clamping pressure of the spring.

Like the control disc 166 of the embodiment of FIGURES 1-5, the diameter of control disc 200 is less than the diameter of the adjacent driving discs 130'. There will be a tendency, therefore, for the control disc 200 to overrun the driving discs 130' when the transmission is delivering torque. But since the discs 130' will slip slightly with respect to the discs 131, the speeds of rotation of disc 130' and of disc 200 will be equal. If the slip increases beyond the desired design slip upon an increase in the driving torque, the control disc 200 will tend to lag behind the discs 130'. This in turn will tend to restrict the degree of communication between passage 156' and the exhaust region through the hub of the control disc. This results in an increase in the clamping pressure of the servo. The resulting increased clamping force will reduce the slip again to the desired design value and the control disc then will assume a new adjusted position and will rotate again in unison with discs 130'.

Referring next to FIGURES 8, 9 and 10, I have illustrated another embodiment which includes a double-acting servo as well as two control discs. It is capable of providing a controlled clamping pressure under driving and coasting conditions that is proportional in magnitude to the torque regardless of the direction of torque delivery through the mechanism. It employs two control discs, one of which is capable of establishing a valving action during torque delivery in one direction and the other of which is capable of providing a corresponding valving action during torque delivery in the opposite direction.

In FIGURE 8, numeral 200 designates a power input shaft. It is formed with a central opening 202 within which is situated a flow distributing insert tube 204. The right-hand end of insert 204 is received within an insert 206 which in turn is disposed within an enlarged portion of the opening 202. The interior of the insert 204 functions as a lubrication oil passage. The space surrounding insert 204 within opening 202 functions as an annular pressure distributor passage for a double-acting servo.

A sun disc hub 208 is splined at 210 to the power input shaft 200. Hub 208 is externally splined to facilitate a splined driving connection with sun discs 212, each of which is formed with an enlarged periphery 214 which define opposed conical friction driving surfaces.

Situated adjacent the discs 212 is a pressure disc 216 having a rim portion that cooperates with the rim portion of the adjacent disc 212.

Surrounding shaft 200 is a sleeve extension 218 of an annular servo cylinder 220 within which is situated an annular piston 222. The piston 222 and the cylinder 220 cooperate to define a pressure chamber 224.

Piston 222 includes an axial extension 226 that surrounds extension 218 of the cylinder 220. It is slidably positioned upon extension 218 and a fluid seal 228 is situated between the relative sealing surfaces.

An annular groove 230 is formed in the extension 226 and cooperates with a radial passage 232 formed in extension 218. This passage 232 in turn communicates with a radial passage 234, which is connected to the annular passage defined by the opening 202 in shaft 200.

Annular groove 230 is elongated in an axial direction so that communication between it and passage 234 is continuous regardless of relative sliding movement of the piston 222 with respect to the cylinder 220.

Annular groove 230 communicates with the interior of the pressure chamber 224 through an internal passage 236 formed in extension 226.

The open end of the cylinder 220 is sealed by a closure member 238 which cooperates with the piston and the cylinder to define a second working chamber 240.

Piston 222 is biased normally in a left-hand direction, as viewed in FIGURE 8, by a spring 242.

The thrust applied to the piston is transferred to the pressure disc 216 by means of a force transfer member 244.

A first carrier disc assembly comprising discs 246 is carried upon a splined carrier disc shaft 248. This shaft in turn is supported by supporting arms 250 and 250' which correspond respectively to the arms 116 and 116' of the embodiment of FIGURES 1 through 5. A second group of carrier discs 252 is also splined to the shaft 248. Shaft 248 in turn is journalled within cooperating openings formed in the arms 250 and 250'.

The discs 246 are situated in interdigital frictional driving relationship with respect to sun discs 212. They are conical in form so that their frictional surfaces cooperate with the opposed conical surfaces of the peripheries of discs 212.

Discs 252 are situated in interdigital, frictional driving relationship with respect to power output ring discs 254 which are connected to a driven drum member 256 by means of spline connections. A reaction disc 258 is situated adjacent disc 254 and is held axially fast by snap-ring 260.

A pressure disc 262 is carried by drum member 256 and is adapted to apply clamping pressure to disc 254 thereby establishing a frictional driving relationship between discs 254 and disc 252. Pressure is applied to the clamping disc 262 by means of a spring 264 which is situated between the outer peripheral portion 266 of a wall member 268 for the driven drum and an annular pressure disc 270.

The end wall member 268 of the driven drum is formed with an opening at its hub which receives a driven shaft 272. The shaft 272 can be splined or otherwise positively connected to the wall member 268.

Shaft 200 is journalled by means of bushings 274 to an interior opening formed in driven shaft 272. A thrust washer 276 is disposed between the shaft 200 and the driven shaft 272.

Surrounding shaft 200 are control discs 278 and 280. The hub of each disc 278 and 280 forms a portion of a rotary valve that can best be seen by referring to FIGURES 9 and 10. The hub portion of disc 278 is indicated by reference character 282. It is formed with two internal valve lands 284 and 286 which are slidably positioned upon shaft 200. A high pressure supply port 287 is formed in shaft 200 and communicates with a radially extending feed passage 288. Shaft 200 is formed also with an exhaust port 290 which communicates with the radial exhaust passage 292.

Pressure may be supplied to the central opening 202 in shaft 200 through a flow restricting orifice formed in an insert 294. The pressure then may pass from this portion of the opening 202 into the high pressure supply passage 287 through a suitable internal passage, not shown, in shaft 200. In a similar fashion exhaust passage 290 can communicate with the exhaust region within the transmission housing through a suitable passage, not shown, in shaft 200.

A passage 296 communicates through suitable internal passage structure with a passage 298 formed in shaft 200. This passage 298 communicates with an annular groove 300 which in turn communicates with the working chamber 224 through a radial passage 302 formed in extension 218. Passage 296 communicates also with an arcuate space 304 formed between hub 282 and the shaft 200.

A passage 306 communicates with the working chamber 240 and the left-hand side of the piston 222 through suitable internal passage structure that interconnects passage 306 with passage 234, the latter in turn communicating with the right-hand portion of the opening 202. This right-hand portion of the opening 202 is separated from the left-hand portion thereof by an annular spacer 308. Passage 306 is in fluid communication with an arcuate space 310, formed between hub 282 and the shaft 200.

A lost motion connection is established between hub 208 for the sun discs and the control discs 280. This is established by an elongated arcuate slot 312 and a pin 314, carried by hub 208.

The diameter of the control disc 278 is slightly smaller than the diameter of the adjacent sun disc 212. As in the previous embodiment, therefore, this control disc will tend to overspeed the sun discs 212 when torque is being delivered from shaft 200 through the disc drive to the shaft 272. But since the driving sun discs 212 will slip relative to the carrier discs 246, the control disc 278 will rotate at the same speed as the sun discs 212. If the torque should increase, there will be a tendency for the degree of slip to increase. This then will tend to increase the degree of communication between space 304 and passage 287 that is established by valve land 284. At the same time, the degree of communication between exhaust port 290 and arcuate space 310 is increased. This results in increase in the pressure build-up in the working chamber 224 and a corresponding decrease in the pressure that exists in chamber 240 of the servo. As a result of these pressure changes, the clamping pressure will be increased, thereby tending to restore the degree of slip to the desired design value. At this time the control disc 278 assumes a regulating position and it turns at a speed that is equal to the speed of rotation of the sun discs 212.

Situated about shaft 200 is a second control disc 280 as previously indicated. The diameter of this control disc is slightly larger than the diameter of the sun discs 212.

The hub of control disc 280 is indicated by reference character 316. It is formed with valve lands 318 and 320 which cooperate with pressure supply ports formed in shaft 200 in a manner similar to the action of the valve lands 284 and 286 for the control disc 278. In this instance, however, the valve lands cooperate with passages that lead to the servo pressure chambers themselves. Pressure chamber 224 is in fluid communication with passage 322 which in turn is covered by land 318 when the control disc assumes the position shown in FIGURE 10. Passage 324 communicates with the pressure chamber 240 at the left-hand side of the piston 222.

A high pressure supply passage 326 communicates with the opening 202 in shaft 200 at the left-hand side of the separator ring 308. It communicates also with an arcuate space 328 situated between the hub 316 and the shaft 200. A low pressure exhaust passage 330 communicates with the exhaust region and also with an arcuate space 332 disposed between the hub 316 and the shaft 200. When torque is being delivered from the shaft 200 through the drive to the shaft 272, the control disc 280 assumes the position shown in FIGURE 10. Under these conditions the pin 314 is situated at the extreme left-hand end of a cooperating arcuate slot 334. Thus the control disc 280 is capable of acting as a driving disc to supplement the driving action of the sun disc 212.

If we now assume that torque delivery is reversed with the shaft 272 functioning as a driving member and the shaft 200 functioning as a driven member, the discs 212 will tend to overspeed the control disc 280. Under these conditions the pin 314 will be moved off from the stop at the extreme end of the slot 334 and the valve lands 318 and 320 will be moved to a regulating position. The degree of communication between high pressure supply passage 326 and passage 322 extending to the working chamber 224 will be increased and the degree of communication between passage 324 and the exhaust passage 330 will be increased. It thus is apparent that the pressure in working chamber 224 will increase and the pressure in chamber 240 will decrease. This results in an increased clamping pressure which reduces the slip that would be experienced by reason of a reverse torque delivery, and the control 280 then will rotate at the same speed as the sun discs 212. After it assumes a regulating position, an increase in the degree of reverse torque delivery will result in a further increase in the pressure in the working chamber 224 and a further decrease in the pressure in chamber 240. This then will restore again the slip to the design value. The clamping effort then is proportional to the clamping requirements as determined by the degree of slip.

When torque is delivered in a reverse direction in this fashion, the pin 314 will move to the extreme end of the arcuate slot 312 thereby allowing the control disc 278 to function as a driving disc, to supplement the driving action of the sun discs 212, and carrier discs 246.

The valving arrangements and the pressure supply of the embodiment in FIGURES 1–5 and the embodiment in FIGURES 8–10 can be described as being of a non-dissipating type. This is a contrast to the valving arrangement of the embodiment of FIGURES 6 and 7 which may be described as a dissipating type of pressure system. The amount of energy required to maintain adequate pressure in the first and third embodiments is less than the amount of energy required to maintain clamping pressure in the embodiment of FIGURES 6 and 7.

A double-acting servo of the type shown in FIGURES 9 and 10 can be used also in the embodiment of FIGURE 1 which includes a single control disc. In this respect, the resulting arrangement would be very similar to the arrangement shown in FIGURE 8 with the exception that the control disc 280 and its corresponding valving action would be eliminated.

The spring 242 can be designed so that it will establish a mean clamping pressure that will be adequate to maintain the discs in driving relationship during torque delivery under normal cruising conditions. If an increase in torque is required, pressure will build up in working chamber 224 and will decrease in working chamber 240 to augment the force of the spring. If the torque requirements decrease, however, the pressure in working chamber 240 will increase and the pressure in working chamber 224 will decerase correspondingly to subtract from the effective clamping effort of the spring 242. In this way a minimum amount of energy dissipation is required to maintain the proper clamping pressure for various driving torque requirements.

Having thus described preferred embodiments of my invention, what I claim and desire to secure by U.S. Letters Patent is:

1. In a friction disc drive comprising driving and driven members, a first discs mounted upon said driving member for rotation about a first axis, second discs connected to said driven member and mounted for rotation about a second axis, said first discs engaging said second discs in frictional driving relationship, an idler control disc mounted coaxially and relatively rotatably with respect to said first discs, said idler disc frictionally engaging said second discs and having an effective diameter that differs from the corresponding diameter of said first discs, a fluid pressure operated servo means for applying a clamping pressure to said first and second discs to maintain the same in driving relationship, a pressure source, pressure distributor passage structure communicating with said pressure source and extending to said servo means, and valve means for regulating the magnitude of the pressure made available to said servo means by said passage structure including cooperating valve parts carried by said idler disc and by said driving member, said valve parts defining a port communicating with said servo means and forming a part of said passage structure whereby the degree of communication between said pressure source and said servo means is determined by the degree of slip between said first discs and said second discs.

2. A friction disc drive adapted to deliver driving torque from a driving member to a driven member, said drive comprising first discs mounted on said driving member for rotation about a first axis, second discs connected to said driven member and mounted for rotation about a second axis, said first discs engaging said second discs in frictional driving relationship, an idler control disc mounted coaxially and relatively rotatably with respect to one of said members adjacent its associated discs, said idler disc frictionally engaging the discs mounted about the other member and having an effective diameter that differs from the corresponding diameter of its adjacent disc, a fluid pressure operated servo means for applying a clamping force to said first and second discs to maintain the same in frictional driving relationship, a pressure source, pressure distributor passage structure communicating with said source and extending to said servo means, and valve means for regulating the magnitude of the pressure made available to said servo means by said passage structure including cooperating valve parts carried by said control disc and by said one member, said valve parts defining a port communicating with said servo means and forming a part of said passage structure whereby the degree of communication between said pressure source and said servo means is determined by the degree of slip between said first discs and said second discs.

3. In a friction disc drive comprising driving and driven members, first friction discs mounted upon said driving member for rotation about a first axis, second discs connected to said driven discs and mounted for rotation about a second axis, said first discs engaging said second discs in frictional driving relationship, an idler control discs frictionally engaging said second discs and mounted coaxially and relatively rotatably with respect to said first discs, said idler disc having an effective diameter that differs from the corresponding diameter of said first discs, a fluid pressure operated servo means for supplying a clamping pressure to said first and second discs to maintain the same in driving relationship, a pressure source, pressure distributor passage structure communicating with said source and extending to said servo means, and valve means for regulating the magnitude of the pressure made available to said servo means by said passage structure including cooperating valve parts carried by said control disc and by said driving member, the valve part carried by said control disc having an exhaust port communicating with a low pressure exhaust region and cooperating with the valve part carried by said driving member to establish controlled communication between said passage structure and said exhaust region whereby the degree of pressure build-up in said servo means is determined by the degree of slip between said first discs and said second discs.

4. In a friction disc drive comprising driving and driven members, first friction discs mounted upon said driving member for rotation about a first axis, second friction discs connected to said driven member and mounted for rotation about a second axis, said first friction discs engaging said second friction disc in frictional driving relationship, an idler control disc mounted coaxially and rotatably with respect to one of said members adjacent its associated friction discs, said control disc frictionally engaging a disc connected to the other member, said control disc having a diameter that differs from the corresponding diameter of its adjacent discs, a fluid pressure operated servo means for applying a clamping pressure to said first and second friction discs to maintain the same in driving relationship, a pressure source, pressure distributor passage structure communicating with said source and extending to said servo means, valve means for regulating the magnitude of the pressure made available to said servo means by said passage structure including cooperating valve parts carried by said control disc and by said one member, the valve part carried by said control disc including an exhaust port, said control disc being adapted to vary the degree of communication between said passage structure and an exhaust region through said exhaust port as it is rotated relative to its associated member whereby the degree of pressure build-up in said servo means is determined by the degree of slip between said first discs and said second discs.

5. In a friction disc drive comprising driving and driven members, first discs mounted upon said driving member for rotation about a first axis, second discs connected to said driven member and mounted for rotation about a second axis, said first discs engaging said second discs in frictional driving relationship, an idler control disc mounted coaxially and relatively rotatably with respect to said first discs, said idler disc frictionally engaging said second discs and having an effective diameter that differs from the corresponding diameter of said first discs, a fluid pressure operated servo means for applying a clamping force to said first and second discs to maintain the same in driving relationship, a pressure source, pressure distributor passage structure communicating with said pressure source and extending to said servo means, and valve means for regulating the magnitude of the pressure made available to said servo means by said passage structure including cooperating valve parts carried by said idler disc and by said driving member, said servo means comprising a fluid pressure operated member with opposed pressure chambers situated on either side thereof, said value parts forming a part of said passage structure and defining flow distributing ports, a separate port communicating with a separate one of said working chambers and another port communicating with an exhaust region, the degree of communication between said pressure source and one working chamber increasing and the corresponding communication between said pressure source and the other working chamber decreasing as said control disc is moved in one direction whereby the clamping force is varied in accordance with the torque delivery requirements.

6. A friction disc drive adapted to deliver driving torque from a driving member to a driven member, said drive comprising first discs mounted on said driving member for rotation about a first axis, second discs connected to said driven member and mounted for rotation about a second axis, said first discs engaging said second discs in frictional driving relationship, an idler control disc mounted coaxially and relatively rotatably with respect to one member adjacent its associated discs, said idler disc frictionally engaging a disc mounted on the other member and having an effective diameter that differs from the corresponding diameter of its adjacent disc, a fluid pressure operated servo means for applying a clamping force to said first and second discs to maintain the same in frictional driving relationship, a pressure source, pressure distributor passage structure communicating with said source and extending to said servo means, and valve means for regulating the magnitude of the pressure made available to said servo means by said passage structure including cooperating valve parts carried by said idler disc and said one member, said valve parts defining a port communicating with said servo means and forming a part of said passage structure whereby the degree of communication between said pressure source and said servo means is determined by the degree of slip between said first discs and said second discs, said servo means comprising a fluid pressure operated member with opposed pressure chambers situated on either side thereof, said valve parts defining also second and third ports communicating respectively with a separate one of said working chambers, the degree of communication between said pressure source and one working chamber increasing and the corresponding communication between said pressure source and the other working chamber decreasing as said control disc is moved in one direction whereby the clamping force is determined by the degree of slip between said first discs and said second discs.

7. In a friction disc drive comprising driving and driven members, first friction discs mounted upon said driving member for rotation about a first axis, second friction discs connected to said driven member and mounted for rotation about a second axis, said first friction discs engaging said second friction discs in frictional driving relationship, first and second idler control discs mounted coaxially and rotatably with respect to said first discs, said control discs being adapted to engage frictionally said second discs, the diameter of said first control disc being less than the corresponding diameter of said first discs and the diameter of said second control disc being greater than the corresponding diameter of said first discs, a fluid pressure operated servo means for applying a clamping pressure to said first and second friction discs to maintain the same in driving relationship, a pressure source, pressure distributor passage structure communicating with said source and extending to said servo means, and valve means for regulating the magnitude of the pressure made available to said servo means by said passage structure including separate valve parts carried by each idler control disc and cooperating parts carried by said driving member, said valve parts defining ports communicating with said servo means and forming a part of said passage structure, one control disc being adapted to regulate the degree of communication between said pressure source and said servo means through one port upon torque delivery through said drive from said driving member to said driven member and the other control disc being adapted to control the degree of communication between said pressure means and said servo means through another port upon torque delivery through said drive in the opposite direction, the magnitude of the clamping effort of said servo means thereby being proportional to the degree of slip between said driving disc and said driven disc regardless of the direction of torque delivery through said drive.

8. In a friction disc drive comprising driving and driven members, first friction discs mounted upon said driving member for rotation about a first axis, second friction discs connected to said driven member and mounted for rotation about a second axis, said first friction discs engaging said second friction discs in frictional driving relationship, first and second idler control discs mounted coaxially and rotatably with respect to said first friction disc, said control discs being adapted to engage frictionally said second discs, the effective diameter of said first control disc being less than the corresponding diameter of said first discs and the effective diameter of said second control disc being greater than the corresponding diameter of said first discs, a fluid pressure operated servo means for applying a clamping pressure to said first and second friction discs to maintain the same in driving relationship, a pressure source, pressure distributor passage structure communicating with said source and extending to said servo means, valve means for regulating the magnitude of the pressure made available to said servo means by said passage structure including separate valve parts carried by each idler control disc and cooperating parts carried by said driving member, said valve parts defining ports communicating with said servo means and forming a part of said passage structure, one control disc being adapted to regulate the degree of communication between said pressure source and said servo means through one port upon torque delivery through said drive from said driving member to said driven member and the other control disc being adapted to control the degree of communication between said pressure source and said servo means through another port upon torque delivery through said drive in the opposite direction, the magnitude of the clamping effort of said servo means thereby being proportional to the degree of slip between said first discs and said second discs regardless of the direction of torque delivery through said drive, and a lost motion connection between said driving member and each control disc whereby a limited rotary movement of said control discs with respect to said driving member is accommodated, each lost motion connection being adapted to connect drivably said driving member to a separate one of said control discs during torque delivery in one direction while the other control disc assumes a pressure regulating position.

9. In a friction disc drive comprising driving and driven members, first friction discs mounted upon said driving member for rotation about a first axis, a second friction discs connected to said driven member and mounted for rotation about a second axis, said first friction discs engaging said second friction discs in frictional driving relationship, first and second idler control disc mounted coaxially and rotatably with respect to said driving disc, said control discs being adapted to engaged frictionally said second discs, the effective diameter of said first control disc being less than the corresponding diameter of said first discs and the effective diameter of said second control disc being greater than the corresponding diameter of said first discs, a fluid pressure operated servo means for applying a clamping pressure to said first and second friction discs to maintain the same in driving relationship, a pressure source, pressure distributor passage structure communicating with said source and extending to said servo means, valve means for regulating the magnitude of the pressure made available to said servo means by said passage structure including separate valve parts carried by each idler control disc and cooperating parts carried by said driving member, said valve parts defining ports communicating with said servo means and forming a part of said passage structure, one control disc being adapted to regulate the degree of communication between said pressure source and said servo means through one port upon torque delivery through said drive from said driving member to said driven member and the other contol disc being adapted to control the degree of communication between said pressure source and said servo means through another port upon torque delivery through said drive in the opposite direction, the magnitude of the clamping effort of said servo means thereby being proportional to the degree of slip between said first discs and said second discs regardless of the direction of torque delivery through said drive, said servo means comprising a pair of fluid pressure chambers situated on either side of a pressure operated member, two of said ports being defined by each control disc, each control disc defining also an exhaust passage, each port communicating with a separate one of said pressure chambers, each control disc being adapted to increase the degree of communication between said pressure source and one working chamber and to decrease the degree of communication between said pressure source and the other working chamber upon rotation thereof in one direction while regulating simultaneously the degree of communication between the exhaust passage and said working chambers.

10. In a friction disc drive comprising driving and driven members, sun discs connected to said driving member, ring discs connected to said driven member, carrier discs situated between said driving discs and said driven discs including a first group disposed in interdigital frictional driving relationship with respect to said ring discs and a second group situated in interdigital frictional driving relationship with respect to said sun discs, an idler control disc mounted coaxially and relatively rotatably with respect to said sun discs, said control disc having an effective diameter that differs from the corresponding diameter of said sun discs, a fluid pressure operated servo means for applying a clamping pressure to said sun discs and the second group of carrier discs to maintain the same in driving relationship, a pressure source, pressure distributor passage structure communicating with said pressure source and extending to said servo means, and valve means for regulating magnitude of the pressure made available to said servo means by said passage structure including cooperating valve parts carried by said idler disc and said driving member, said valve parts defining a port communicating with said servo means and forming a part of said passage structure whereby the degree of communication between said pressure source and said servo means is determined by the degree of slip between said sun discs and said second carrier disc group.

11. In a friction disc drive comprising driving and driven members, sun discs connected to said driving member, ring discs connected to said driven member, carrier discs situated between said driving discs and said driven discs including a first group disposed in interdigital frictional driving relationship with respect to said ring discs and a second group situated in interdigital frictional driving relationship with respect to said sun discs, an idler control disc mounted coaxially and relatively rotatably with respect to said sun discs, said idler disc frictionally engaging a carrier disc and having an effective diameter that differs from the corresponding diameter of said sun disc, a fluid pressure operated servo means for applying a clamping pressure to said sun and carrier discs to maintain the same in driving relationship, a pressure source, pressure distributor passage structure communicating with said pressure source and extending to said servo means, and valve means for regulating magnitude of the pressure made available to said servo means by said passage structure including cooperating valve parts carried by said idler disc and by said driving member, said servo means comprising a fluid pressure operated member with opposed pressure chambers situated on either side thereof, said valve parts defining separate ports each communicating with a separate one of said working chambers, the degree of communication between said pressure source and one working chamber increasing and the corresponding communication between said pressure source and the other working chamber decreasing as said control disc is moved rotatably in one direction whereby the clamping force is determined by the torque delivery requirements of said drive.

12. In a friction disc drive comprising driving and driven members, sun discs connected to said driving member, ring discs connected to said driven member, carrier discs situated between said driving discs and said driven discs including a first group disposed in interdigital frictional driving relationship with respect to said ring discs and a second group situated in interdigital frictional driving relationship with respect to said sun discs, first and second idler control discs mounted coaxially and rotatably with respect to said driving member, said control discs being adapted to engage frictionally said carrier discs, the diameter of said first control disc being less than the corresponding diameter of said sun discs and the diameter of said second control disc being greater than the corresponding diameter of said sun discs, a fluid pressure operated servo means for applying a clamping force to said sun and carrier discs to maintain the same in driving relationship, a pressure source, pressure distributor passage structure communicating with said source and extending to said servo means, valve means for regulating the magnitude of the pressure made available to said servo means by said passage structure including valve parts carried by each idler control disc and cooperating parts carried by said driving member, said valve parts defining ports communicating with said servo means and forming a part of said passage structure; one control disc being adapted to regulate the degree of communication between said pressure source and said servo means through one port upon torque delivery through said drive from said driving member to said driven member and the other control disc being adapted to control the degree of communication between said pressure source and said servo means through another port upon torque delivery through said drive in the opposite direction, the magnitude of the clamping effort of said servo means thereby being proportional to the degree of slip between said sun discs and said carrier discs regardless of the direction of torque delivery through said drive, and a lost motion connection between said driving member and each control disc whereby a limited rotary movement of said control discs with respect to said driving member is accommodated, each lost motion connection being adapted to connect drivably said driving member to a separate one of said control discs during torque delivery in one direction while the other control disc assumes a pressure regulating position.

13. A friction disc drive comprising a driving disc and a driven disc disposed in frictional driving relationship, a fluid pressure operated servo means for applying a frictional engaging force to said discs, a pressure source, passage structure connecting said source with said servo means, and valve means in fluid communication with said passage structure for regulating the magnitude of the pressure build-up in said servo in accordance with the degree of slip between said driving and driven discs, said valve means including relatively movable parts that are adapted to respond to changes in relative motion between said driving and driven discs.

References Cited by the Examiner
UNITED STATES PATENTS 3,043,150 7/62 Skuba _____ 74—199
3,099,927 8/63 Anderson _____ 74—199 X DON A. WAITE, *Primary Examiner.*